Nov. 15, 1927.
F. L. PHILLIPS
VISION SHIELD FOR VEHICLES
Original Filed June 23, 1922
1,649,418
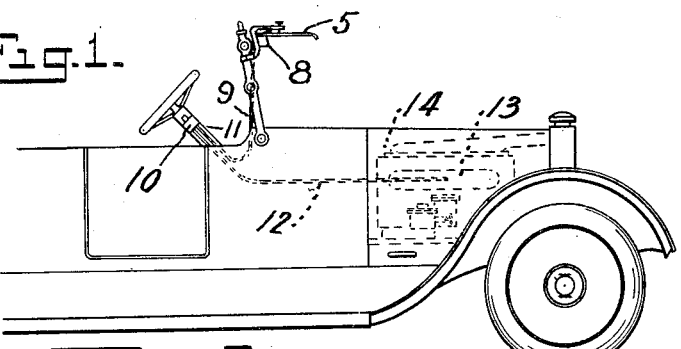
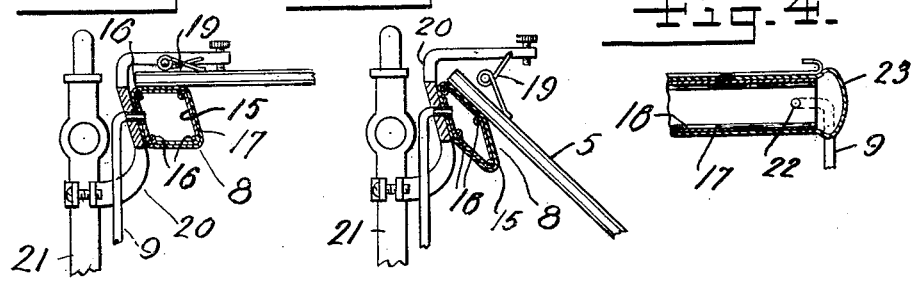
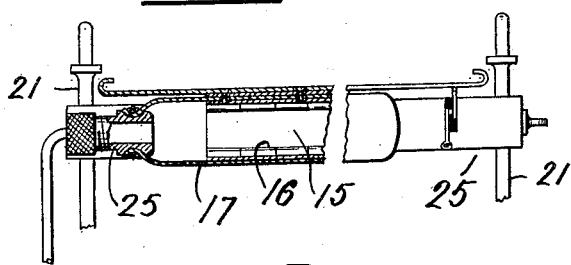
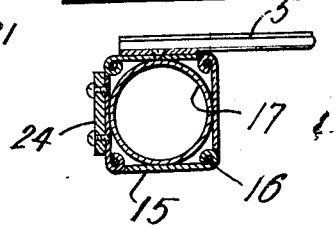
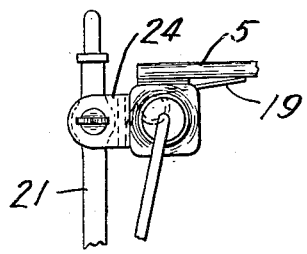
Inventor
Fred L. Phillips
By his Attorney
Abel L. Brownrigg Patented Nov. 15, 1927.

1,649,418

UNITED STATES PATENT OFFICE.

FRED L. PHILLIPS, OF NEW YORK, N. Y.

VISION SHIELD FOR VEHICLES.

Application filed June 23, 1922, Serial No. 570,335. Renewed May 18, 1927.

This invention relates generally to anti-glare vision shields for vehicles and to vacuum actuated means for operating the same.

Vision shields or screens for use on automobiles and adapted to be interposed between the eyes of the driver of the vehicle and a source of blinding light such as the headlights of an approaching vehicle, have been heretofore known and used. Such shields have been formed of glass or celluloid or other translucent material suitably tinted or colored to effect the desired purpose and movably supported on the framework of the windshield to be manually moved through suitable mechanical elements into or out of operative position. The actuating means for such devices have been difficult to manipulate and in addition have been placed in relatively inaccessible locations so that it has been necessary to stop the vehicle to operate the shield or to run the risk of an accident in reaching for the shield actuating means with one hand while operating the steering wheel with the other.

A principal object of the present invention is to provide a vision shield or screen for vehicles, which will be free from the objections referred to and in connection with which power operating means are employed which are manually controlled by means readily available to the hand or foot of the driver.

The invention includes the provision of an anti-glare shield mounted in hinged relation to the upper frame member of the windshield and provided with a pneumatic actuating device for moving the shield into operating position and with spring or equivalent means for moving the shield into its normal inoperative position. Power for operating the pneumatic actuating means is supplied by a vacuum or suction effect supplied by a suitable connection with the intake manifold of the engine and controlled by a valve device mounted on the steering post or in some other equally accessible location with respect to the hands or feet of the driver.

Other features of the invention will be hereinafter described.

In the drawings, in which a preferred form of the invention has been selected for illustration, Figure 1 is a view in side elevation of a portion of a vehicle showing an anti-glare shield embodying the invention applied thereto.

Figure 2 is a view partly in end elevation and partly in section of a detail showing the manner of mounting the vision shield on the windshield framework.

Figure 3 is a view similar to Figure 2 showing the vision shield in lowered position.

Figure 4 is a sectional view showing a detail of the construction of a collapsible tube forming part of the invention.

Figure 5 is a view partly in front elevation and partly in section of a modified form of the invention.

Figure 6 is an end view of a device shown in Figure 5.

Figure 7 is a sectional view of still another form of the invention.

Referring to the drawings for a more detailed description of the invention a portion of an automobile is shown in Figure 1 to which is attached a vision shield or screen 5 having a hinged connection with the upper horizontal frame piece of the windshield framework. The shield 5 may be conveniently formed of glass or celluloid or other transparent material and mounted in a suitable metal frame in an obvious manner.

In order to operate the vision shield and cause it to swing to a lowered operative position interposed between the eyes of the driver and a glaring source of light, or to a raised position where it is removed from screening position, actuating means 8 are provided which take the general form of a collapsible tube mounted in the angle enclosed between the screen and the framework of the windshield. The collapsible tube 8 has a conduit connection 9 with a simple form of valve controlling means 10 mounted in a readily accessible location on the steering post 11 which is in turn connected through the conduit connection 12 with the intake manifold 13 of the engine 14.

The collapsible tube 8 consists of an inner member formed of elongated strips 15 which extend the full length or a portion of the length of the shield 5 and are joined together with a hinged connection 16 at their lateral margins. In the drawings four strips 15 are joined together to form a tubular member substantially square in cross-section when expanded and adapted to take a relatively flat diamond shape when collapsed. In order to make the tubular actuating means air tight, the metal inner part is covered or lined with a flexible tube 17 which may be conveniently formed of rubberized fabric. It will be clear that the flexible covering member 17 will respond to the collapsing or expanding action of the metal inner tube as indicated in the drawings.

Cooperation between the collapsible tube 8 and the shield 5 is produced in the example shown by rigidly attaching the rear plate 15 of the metal tube to brackets 20 carried by the upper ends of the windshield stanchion members 21 and the upper plate to the rear frame member of the screen or shield 5. It will be seen that the rear and the upper plate thus form a hinge connection between the shield 5 and the windshield supporting framework.

The ends of the flexible tubular members 17 preferably terminate in expanded portions formed of the same material and presenting flat or rounded ends 23. This construction permits a free expansion and contraction of the hinged sections without tearing or otherwise injuring the flexible tubular member 17.

In order to move the shield 5 to its upper or non-operative position spring members 19 are provided which bear against the free ends of the bracket members on one hand and against the frame member of the vision shield 5 on the other. The spring members 19 act to hold the shield 5 normally elevated and adjustable stop member limit the extent of elevation of the shield.

The conduit connection between the shield 5 and the engine intake manifold 13 provides for exhausting the air from the interior of the collapsible tube 8 and thereby collapsing the tube and swinging the shield to its lowermost position. The upper end of the conduit 9 has communication with the interior of the collapsible tube 8 through a port 22 provided in the rear wall thereof for that purpose. The valve controlling device 10 may be any suitable type through which communication may be established between the collapsible tube 8 and the suction effect of the intake pipe 13 to lower the shield, or between the collapsible tube 8 and atmosphere to permit the spring members 19 to raise the shield to its inoperative position, and to shut off communication between the tube 8 and either atmosphere or intake manifold to hold the shield in an intermediate position.

It will be seen that by means of the construction described power means can be made use of for operating the vision shield, and that readily operable controlling means therefor is made easily accessible to the driver for manipulation at will and with a minimum degree of effort. The controlling valve 10 may, if desired, be located in a position accessible to the foot instead of the hand of the operator.

In the form of the invention shown in Figures 6 and 7 the flexible tubular member 17 is placed inside of instead of outside the casing formed of plates of metal or other suitable material. A bracket 24 carried by the stanchions 21 supports the shield actuating device. In this form of the invention the exhaust pipe, which may be a copper or other tube of relatively small diameter, enters the end of the tubular pneumatic device instead of through the rear wall as in Figures 1 to 4 inclusive. In Figure 5 also the exhausting pipe communicates with the end of the collapsible tube through a nipple 25 to which the end of the outer flexible tube 17 is clamped. It will be clear that in closed cars the shield operating member will be attached directly to the front wall instead of to the windshield stanchions 21.

I find that with the relatively great area provided by the collapsible tube walls, sufficient power is exerted to amply provide for the operation of the shield member, so that the blinding glare of approaching powerful headlights on another car can be instantly eliminated with a minimum degree of exertion on the part of the driver. This effectually eliminates all dependence upon the other driver to dim his headlights. The invention is not limited to automobiles but may be employed in any situation where similar conditions obtain as for instance on marine craft and even on airships when flying against the sun.

What I claim is:

1. In an anti-glare device for automobiles, a screen having a hinged connection with the upper part of the windshield frame, a collapsible tubular member mounted in the angle between the base of the screen and the windshield, a conduit connection between the collapsible tube and the intake manifold of the engine, and valve controlling means for said conduit mounted in an accessible position to the hand or foot of the driver.

2. In an anti-glare device for automobiles, a screen having a hinged connection with the upper part of the windshield, a collapsible tubular member formed of elongated strips hinged together at their lateral margins, said tubular member being covered with an airtight flexible tube, one of said plates being attached to the windshield and another of said plates being attached to the screen, and a valve controlled connection between the collapsible tubular member and the intake manifold of the engine.

3. In an anti-glare device for automobiles, a screen having a hinged connection with the upper part of the windshield, a collapsible tubular member mounted in the angle between the base of the screen and the windshield framework, said collapsible member being connected to the intake manifold of the engine, and spring means arranged to normally hold the screen in elevated position.

4. In an anti-glare device for automobiles, a screen having a hinged connection with the upper part of the windshield, a collapsible tubular member mounted in the angle between the base of the screen and the windshield framework and attached to said screen and said framework, said collapsible tubular member being connected to the intake manifold of the engine, spring means arranged to normally lift and hold the screen in elevated position, and valve means in said connection arranged to connect the tubular member to the intake manifold to lower the shield or to connect the tubular member to atmosphere to permit the spring means to elevate the screen or to shut off communication of the tubular member with either the intake pipe or the atmosphere whereby to hold the screen in an intermediate position.

FRED L. PHILLIPS.